US009225259B2

(12) United States Patent
Deng

(10) Patent No.: US 9,225,259 B2
(45) Date of Patent: Dec. 29, 2015

(54) AUTOMATIC VOLTAGE CONVERSION SYSTEM BASED ON A SINGLECHIP

(71) Applicant: STABA Electric Co., Ltd, Guangdong (CN)

(72) Inventor: Yuhua Deng, Guangdong (CN)

(73) Assignee: STABA Electric Co., Ltd, Guangdong (CN)

(*) Notice: Subject to any disclaimer, the term of this patent is extended or adjusted under 35 U.S.C. 154(b) by 315 days.

(21) Appl. No.: 13/691,938

(22) Filed: Dec. 3, 2012

(65) Prior Publication Data

US 2013/0182473 A1    Jul. 18, 2013

(30) Foreign Application Priority Data

Jan. 18, 2012  (CN) .......................... 2012 1 0015565

(51) Int. Cl.
*G05F 5/00*    (2006.01)
*H02M 7/21*    (2006.01)
*H02M 1/10*    (2006.01)

(52) U.S. Cl.
CPC . *H02M 7/21* (2013.01); *H02M 1/10* (2013.01)

(58) Field of Classification Search
USPC .................. 323/299, 301; 363/142, 143, 147
See application file for complete search history.

(56) References Cited

U.S. PATENT DOCUMENTS

| 4,843,301 | A  | * | 6/1989 | Belanger ....................... 323/224 |
| 5,001,623 | A  | * | 3/1991 | Magid ............................ 363/143 |
| 5,920,467 | A  | * | 7/1999 | Bowyer et al. ................. 363/37 |
| 6,087,818 | A  | * | 7/2000 | Hughes ......................... 323/301 |
| 6,108,226 | A  | * | 8/2000 | Ghosh et al. ................. 363/142 |
| 8,159,198 | B2 | * | 4/2012 | Dishman et al. .............. 323/255 |
| 2011/0199067 | A1 | * | 8/2011 | Revak .......................... 323/301 |
| 2013/0182473 | A1 | * | 7/2013 | Deng .............................. 363/84 |

* cited by examiner

*Primary Examiner* — Jeffrey Sterrett
(74) *Attorney, Agent, or Firm* — Loginov & Associates, PLLC; William A. Loginov

(57) ABSTRACT

The invention discloses an automatic voltage conversion system based on a singlechip, comprising a control unit, a power circuit unit, a transformer unit, a voltage sampling unit, an output protection unit and a voltage switching unit; wherein, the power circuit unit provides suitable working voltage for the whole circuit; the voltage sampling switching units are respectively connected to the control unit; the transformer unit is connected to the voltage switching unit; the output protection unit input is connected to the control unit, and output protection unit output is connected to the transformer unit; and the control unit, as a control system based on a singlechip, is used for controlling operation of both the voltage switching and output protection units after processing the signal gathered by the voltage sampling unit. The system can perform automatic voltage conversion, and high and low input voltage protection and provide transformer over temperature protection.

6 Claims, 1 Drawing Sheet

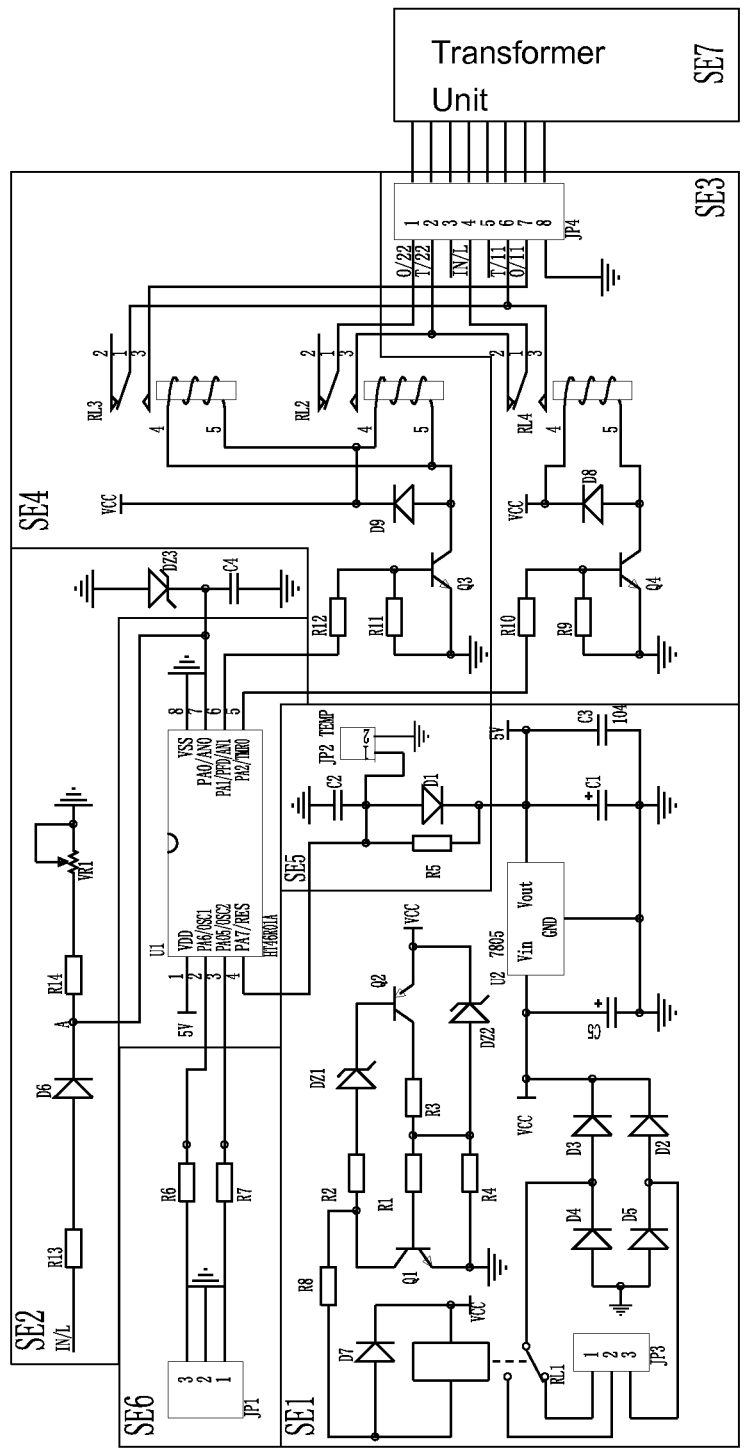

AUTOMATIC VOLTAGE CONVERSION SYSTEM BASED ON A SINGLECHIP

FIELD OF THE INVENTION

The invention relates to an automatic voltage conversion system, in particular to an automatic voltage conversion system based on a singlechip.

BACKGROUND OF THE INVENTION

With the deepening of globalization, international trade, travel, expatriating work are becoming more and more common. However, there are different mains voltages (like 110 v, 120 v, 220 v, 230 v and 240 v) in different countries worldwide, which leads to unavailability of electric equipment in different countries or areas. For example, Japanese printing equipment are unavailable in Pakistani factories; when people go on a journey or go on a business trip at a foreign land, they may find that electric equipment taken along are unavailable because they are mismatched to the local mains voltage. Therefore, it is necessary to use a voltage conversion device to match electric equipment to different supply voltages.

The currently conventional voltage conversion technique adopts change of transformer turns ratio for voltage conversion. This technique has certain shortcomings; above all, there is a potential hazard during tap changing of transformers, particularly:

Vin/Vout=Nin/Nout
Vin: input voltage
Vout: output voltage
Nin: number of turns for input voltage
Nout: number of turns for output voltage If an input voltage is 110V, the output voltage is required to be 220V, and Nin/Nout shall be ½; under this circumstance, if users use an input voltage of 220v by mistake, the output voltage will be 440V. Obviously, such a high output voltage certainly will burn out electric equipment connected to the voltage output end.

At present, common electric appliances have a rated input voltage range of 93V-127V or 190V-245V. Usually, electric appliances may be subject to overburning if they are unprotected. Voltage in power grid is fluctuant. In some areas, voltage fluctuation is as high as 100V during certain time interval. Electric equipment can easily be damaged by such a high voltage fluctuation. In addition, when an input voltage of 110V is required for conversion of an output voltage of 220V, voltage fluctuation can be magnified twice, which can more easily destroy electric equipment.

Furthermore, when a voltage is lowered, load current in transformer coil is increased. If not equipped with a protector, the transformer running at a low voltage for a long time can be easily burned out or even arouses a fire disaster.

A friendly user interface is very important for product design. Users are relieved to use a product if they know its real-time status and variation trend.

On the basis of abovementioned description, it is necessary to improve the existing automatic voltage conversion system, so as to overcome at least one of shortcomings mentioned above. The invention provides a scheme, aiming at how to conduct automatic voltage conversion, high and low voltage protection, transformer over temperature protection and readable user interface.

SUMMARY OF THE INVENTION

Aiming at solving the above-mentioned problems, the invention provides an automatic voltage conversion system based on a singlechip, which is capable of automatic voltage conversion, high and low voltage protection and transformer over temperature protection.

In order to solve the technical problems, the invention adopts a technical scheme mentioned as below:

The invention relates to an automatic voltage conversion system based on a singlechip, comprising a control unit, a power circuit unit, a transformer unit, a voltage sampling unit and a voltage switching unit; wherein, the power circuit unit provides suitable working voltage for the whole circuit; the voltage sampling unit and the voltage switching unit are respectively connected to the control unit; and the transformer unit is connected to the voltage switching unit. The automatic voltage conversion system based on a singlechip is characterized in that:

The automatic voltage conversion system based on a singlechip also comprises an output protection unit. The input end of the output protection unit is connected to the control unit, and the output end of the output protection unit is connected to the transformer unit.

The control unit, as a control system based on a singlechip, is used for controlling operation of both the voltage switching unit and the output protection unit after processing the signal gathered by the voltage sampling unit.

As a further improvement of the above-mentioned technical scheme, the automatic voltage conversion system based on a singlechip also comprises a transformer temperature sampling unit; the signal output end of the transformer temperature sampling unit is connected to the control unit, while the signal input end of the transformer temperature sampling unit is connected to a temperature controller installed on the transformer unit.

As a further improvement of the above-mentioned technical scheme, the automatic voltage conversion system based on a singlechip also comprises a LED display unit; the LED display unit is connected to the control unit.

Further, the power circuit unit includes a selection circuit (primarily comprising a first triode, a second triode and a first relay), a full bridge rectifier circuit, an integrated regulator and a filter circuit; wherein, the selection circuit, via the full bridge rectifier circuit, is connected to the input end of the integrated regulator; the filter circuit is connected to the output end of the integrated regulator; and the output end of the integrated regulator is connected to the power end of the control unit.

Further, the output protection unit mainly includes a third triode, a second relay and a third relay; wherein, the base of the third triode is connected to the control unit U1 via a resistor; the collector of the third triode is respectively connected to the second relay and the third relay; and the emitter of the third triode is directly grounded.

Further, the voltage sampling unit comprises a first divider resistor, a rectifier diode, a second divider resistor and a slide resistor which are connected in series in sequence; wherein, the junction between the rectifier diode and the second divider resistor is a sampling node; the sampling node is connected to the sampling port of the control unit.

As a further improvement of the above-mentioned technical scheme, the sampling node is connected to two sub-circuits; wherein, the first sub-circuit, grounded via a Zener diode, is used for clamping voltage; while the second sub-circuit, grounded via a filter capacitor, is used for protection.

The invention has a beneficial effect as below: the automatic voltage conversion system uses a singlechip as a microcomputer for control and for realization of automatic voltage conversion in conjunction with peripheral voltage and temperature sampling circuits, the voltage switching circuit and the output protection circuit, thus preventing electric equipment from being damaged by man-made misoperation. In addition, the singlechip control unit also can, on the basis of processing of voltage and temperature signals collected by the sampling circuits, connect and disconnect electric equipment to and from mains voltage by controlling make-and-break of the output protection circuit, thus preventing electric equipment from being damaged by over voltage or under voltage (i.e. excess temperature of a transformer). Furthermore, the system also is equipped with a LED display unit, by which, users can know the real-time status and variation trend of electric equipment. In this way, they are relieved to use the electric equipment.

BRIEF DESCRIPTION OF THE DRAWINGS

Brief description related to the technical schemes of the embodiment of the invention is made in conjunction with the accompanying drawings required for description of the embodiment. Obviously, the accompanying drawings serve as only a part of embodiments of the invention instead of all embodiments. Technicians in this field also can, on the precondition of not contributing their creative work, obtain other design schemes and drawings on the basis of these accompanying drawings:

FIG. 1 is a schematic circuit diagram for the embodiment of the invention.

DETAILED DESCRIPTION OF THE EMBODIMENTS

A distinct and complete description is made regarding the conception, the concrete structure and technical effect of the invention in conjunction with embodiments and the accompanying drawings, so as to fully understand objectives, characteristics and effects of the invention. Obviously, the described embodiment is only a part of embodiment of the invention instead of all embodiments. On the basis of the embodiment of the invention, technicians in this field also can, on the precondition of not contributing their creative work, obtain other embodiments which shall be within the scope of protection of the invention.

FIG. 1 shows a schematic circuit diagram for the embodiment of the invention (an automatic voltage conversion system based on a singlechip), in which, O/22 is connected to 220V output, T/22 is connected to the 220V tapping of the transformer, IN/L is connected to the live wire, T/11 is connected to the 110V tapping of the transformer, and O/11 is connected to 110V output. The system comprises a control unit U1, a power circuit unit SE1, a transformer unit SE7, a voltage sampling unit SE2 and a voltage switching unit SE3, an output protection unit SE4, a transformer temperature sampling unit SE5 and a LED display unit SE6; wherein, the power circuit unit SE1 provides suitable working voltage for the whole circuit; the voltage sampling unit SE2, the voltage switching unit SE3, the output protection unit SE4 and the transformer temperature sampling unit SE5 are respectively connected to the control unit U1; the transformer unit SE7 is connected to the voltage switching unit SE3; the output end of the output protection unit SE4 is connected to the transformer unit SE7; and the control unit U1, as a control system based on a singlechip, is used for controlling operation of both the voltage switching unit SE3 and the output protection unit SE4 after processing the signal gathered by the voltage sampling unit SE2.

The power circuit unit SE1 includes a selection circuit (primarily comprising a first triode Q1, a second triode Q2 and a first relay RL1), a full bridge rectifier circuit, an integrated regulator and a filter circuit; wherein, the selection circuit, via the full bridge rectifier circuit, is connected to the input end of the integrated regulator; the filter circuit is connected to the output end of the integrated regulator; and the output end of the integrated regulator is connected to the power end of the control unit U1. When VDD power is too high, the first triode Q1 is switched on, so the first relay RL1 is actuated, and the working power is switched to a power package with lower voltage. On the contrary, when VDD power is too low, the first triode Q1 is switched off, so the first relay RL1 is released, and the working power is switched to a power package with higher voltage. The power package can, via the full bridge rectifier circuit, the capacitor filter circuit and the integrated regulator, output +5VDC, providing stable working voltage for the singlechip.

The voltage sampling unit SE2 comprises a first divider resistor R13, a rectifier diode D6, a second divider resistor R14 and a slide resistor VR1; wherein, the junction between the rectifier diode D6 and the second divider resistor R14 is a sampling node A; the sampling node A is connected to the sampling port of the control unit U1; the sampling node A is connected to two sub-circuits, wherein, the first sub-circuit, grounded via a Zener diode DZ3, is used for clamping voltage; while the second sub-circuit, grounded via a filter capacitor, is used for protection.

The voltage switching unit SE3 mainly includes a fourth triode Q4 and a fourth relay RL4. The output protection unit SE4 mainly includes a third triode Q3, a second relay RL2 and a third relay RL3; wherein, the base of the third triode Q3 is connected to the control unit U1 via a resistor; the collector of the third triode Q3 is respectively connected to the second relay RL2 and the third relay RL3; and the emitter of the third triode Q3 is directly grounded. The singlechip can, on the basis of sampling voltage value, control the work mode of the third triode Q3 and the fourth triode Q4; the signal output end of the transformer temperature sampling unit SE5 is connected to the control unit U1, while the signal input end of the transformer temperature sampling unit SE5 is connected to a temperature controller installed on the transformer unit.

In the embodiment, the singlechip, according to voltage value and the working voltage of the system, presets four work modes as below:

A. When the system is running in good order, the third triode Q3 is switched on, driving the second relay RL2 and the third relay RL3 to be actuated. At this moment, if the input voltage is lower than 125V, the system automatically makes a default rated voltage of 110V. At this moment, the fourth triode Q4 is switched on, driving the fourth relay RL4 to be actuated with the contactor connected to the T11 tapping of the transformer; the input voltage is supplied to the transformer through the T11 tapping.

B. When the input voltage is higher than 130V, the system automatically makes a default rated voltage of 220V. At this moment, the fourth triode Q4 is switched off, driving the fourth relay RL4 to be actuated with the contactor connected to the T22 tapping of the transformer; the input voltage is supplied to the transformer through the T22 tapping.

C. When the 110V system is working and the input voltage is up-regulated to 125V, high voltage protection is activated, at this moment, the third triode Q3 is switched off, controlling both the second relay RL2 and the third relay RL3 to be disconnected; in this way, the voltage output is terminated. However, if the voltage continue rising, it is necessary to switch to the 220V system.

D. When the 220V system is working and the input voltage is down-regulated to 160V, low voltage protection is activated, at this moment, the third triode Q3 is switched off, controlling both the second relay RL2 and the third relay RL3 to be disconnected; in this way, the voltage output is terminated. However, if the voltage continue descending, it is necessary to switch to the 110V system.

E. When the control unit U1 receives sampling of over-temperature, the transformer high temperature protection is activated, at this moment, the third triode Q3 is switched off, controlling both the second relay RL2 and the third relay RL3 to be disconnected; in this way, the voltage output is terminated.

Further, the LED display unit SE6 is connected to the control unit U1, which is capable of real-time detection of both the input voltage and the output voltage, and synchronous display of operating state.

As mentioned above, a detailed description is made regarding a better embodiment of the invention. However, the invention and creation is not limited to this embodiment. Technicians familiar to this field can, on the precondition of not against the invention spirit, make equivalent transformation and substitution, which shall be within the restricted scope of the claim.

What is claimed is:

1. An automatic voltage conversion system based on a singlechip, comprising a control unit (U1), a power circuit unit (SE1), a transformer unit (SE7), a voltage sampling unit (SE2) and a voltage switching unit (SE3), wherein the power circuit unit (SE1) provides suitable working voltage for the whole circuit, the voltage sampling unit (SE2) and the voltage switching unit (SE3) are respectively connected to the control unit (U1), and the transformer unit (SE7) is connected to the voltage switching unit (SE3), the automatic voltage conversion system based on a singlechip also comprises an output protection unit (SE4), the input end of the output protection unit (SE4) is connected to the control unit (U1) while the output end of the output protection unit (SE4) is connected to the transformer unit (SE7), the control unit (U1), as a control system based on a singlechip, is used for controlling operation of both the voltage switching unit (SE3) and the output protection unit (SE4) after processing the signal gathered by the voltage sampling unit (SE2), wherein the output protection unit (SE4) includes a third triode (Q3), a second relay (RL2) and a third relay (RL3), wherein, the base of the third triode (Q3) is connected to the control unit (U1) via a resistor, the collector of the third triode (Q3) is respectively connected to the second relay (RL2) and the third relay (RL3), and the emitter of the third triode (Q3) is directly grounded.

2. The automatic voltage conversion system based on a singlechip of claim 1, wherein it in also comprises a transformer temperature sampling unit (SE5), the signal output end of the transformer temperature sampling unit (SE5) is connected to the control unit (U1), while the signal input end of the transformer temperature sampling unit (SE5) is connected to a temperature controller installed on the transformer unit (SE7).

3. The automatic voltage conversion system based on a singlechip of claim 1, comprising a LED display unit (SE6) that is connected to the control unit (U1).

4. The automatic voltage conversion system based on a singlechip of claim 1, wherein the power circuit unit (SE1) includes a selection circuit that comprises a first triode (Q1), a second triode (Q2) and a first relay (RL1), a full bridge rectifier circuit, an integrated regulator and a filter circuit, wherein the selection circuit, via the full bridge rectifier circuit, is connected to the input end of the integrated regulator, the filter circuit is connected to the output end of the integrated regulator, and the output end of the integrated regulator is connected to the power end of the control unit (U1).

5. The automatic voltage conversion system based on a singlechip of claim 1, wherein the voltage sampling unit (SE2) comprises a first divider resistor (R13), a rectifier diode (D6), a second divider resistor (R14) and a slide resistor (VR1) which are connected in series in sequence; wherein, the junction between the rectifier diode (D6) and the second divider resistor (R14) is a sampling node (A); a sampling node (A) is connected to the sampling port of the control unit (U1).

6. The automatic voltage conversion system based on a singlechip of claim 5, wherein the sampling node (A) is connected to two sub-circuits, and wherein the first sub-circuit, grounded via a Zener diode (DZ3), is used for clamping voltage, while the second sub-circuit, grounded via a filter capacitor (C4), is used for protection.

* * * * *